(12) United States Patent
Sumida et al.

(10) Patent No.: US 7,028,291 B2
(45) Date of Patent: Apr. 11, 2006

(54) DEBUGGING METHOD AND DEBUGGING DEVICE

(75) Inventors: Kiyohiko Sumida, Takatsuki (JP); Hajime Ogawa, Suita (JP); Katsuhiro Okuno, Higashiosaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 532 days.

(21) Appl. No.: 10/191,426

(22) Filed: Jul. 10, 2002

(65) Prior Publication Data

US 2003/0028860 A1 Feb. 6, 2003

(30) Foreign Application Priority Data

Aug. 6, 2001 (JP) ............................. 2001-238028

(51) Int. Cl.
 G06F 9/44 (2006.01)
(52) U.S. Cl. .................................................. 717/128
(58) Field of Classification Search ................ 717/100, 717/125, 130–141, 152; 345/440, 643; 715/772; 703/2, 22, 26; 714/38; 719/318; 709/201, 709/223

See application file for complete search history.

(56) References Cited

U.S. PATENT DOCUMENTS

| 5,659,753 | A | | 8/1997 | Murphy et al. | |
| 5,881,288 | A | * | 3/1999 | Sumi et al. | 717/125 |
| 5,920,716 | A | * | 7/1999 | Johnson et al. | 717/141 |
| 6,367,076 | B1 | | 4/2002 | Imai et al. | |

FOREIGN PATENT DOCUMENTS

| JP | 3161843 | 7/1991 |
| JP | 06274369 | 9/1994 |
| JP | 7271606 | 10/1995 |
| JP | 10021086 | 1/1998 |
| JP | 10187463 | 7/1998 |
| JP | 11259297 | 9/1999 |

OTHER PUBLICATIONS

Rosenberg, Jonathan, "How Debuggers Work", John Wiley & Sons, inc, Copyright 1996, ch. 2, 6, 8, 12.*

* cited by examiner

Primary Examiner—Kakali Chaki
Assistant Examiner—Tuan A. Vu
(74) Attorney, Agent, or Firm—Stevens, Davis, Miller & Mosher, LLP

(57) ABSTRACT

According to the present invention, a compiler generates, as debugging information on variables appearing in a source program and the allocation of hardware resources, location information made up of elements showing, for each entry of a variable, an address range within which the variable is valid, a condition flag which is made true within the address range when the variable is valid, and a resource allocated to the variable. A debugging device analyzes the debugging information and stores it. When examining the value of a variable, an entry for the valid variable is determined from the address currently being executed and the value held in the condition flag register, and the resource allocated to that variable is obtained. In this way, the contents of the variable can be referenced correctly.

4 Claims, 27 Drawing Sheets

| | 501 | 502 | 503 | 504 | 505 |
|---|---|---|---|---|---|
| | VARIABLE NAME | STARTING ADDRESS | ENDING ADDRESS | RESOURCE | CONDITION FLAG |
| | [VARIABLE NAME 1] | [ADDRESS 1] | [ADDRESS 2] | [RESOURCE 1] | [FLAG 1] |
| | [VARIABLE NAME 2] | [ADDRESS 3] | [ADDRESS 4] | [RESOURCE 2] | [FLAG 2] |
| | ... | ... | ... | ... | ... |

F I G. 1
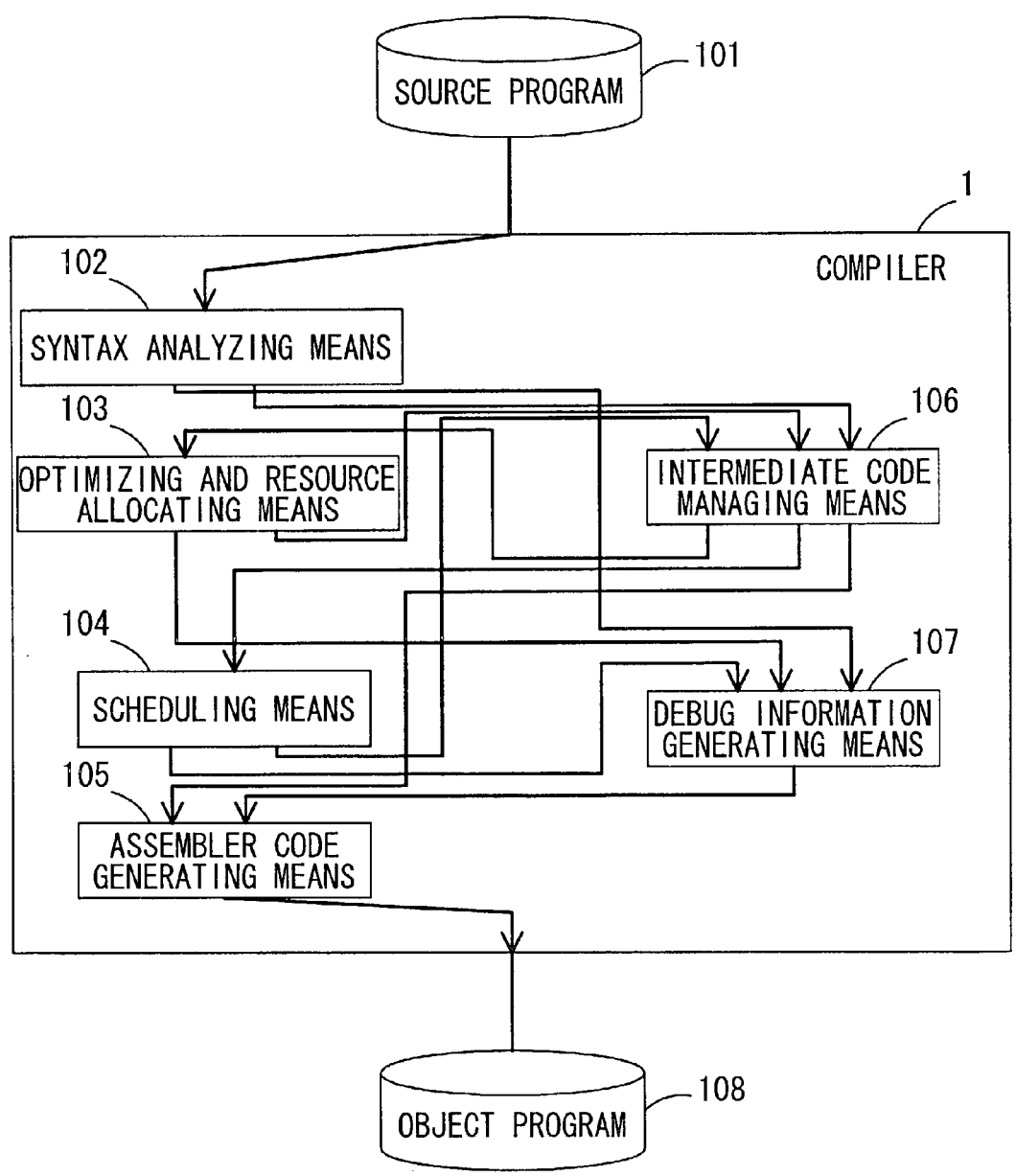

} else { a = 5;

```
            add     10, r0      ;; ..301
L00003
            cmpgq   r0, r1      ;; ..302
            blq     L00008      ;; ..303
L00004
            mov     10, r0      ;; ..304
L00005
            mov     20, r1      ;; ..305
              :
            add     10, r0      ;; ..306
L00006
            add     -5, r1      ;; ..307
L00007
            jmp     L00009      ;; ..308
L00008
            mov     5, r0       ;; ..309
              :
            add     15, r0      ;; ..310
L00009
              :
```

FIG. 5

| VARIABLE NAME 501 | STARTING ADDRESS 502 | ENDING ADDRESS 503 | RESOURCE 504 | CONDITION FLAG 505 |
|---|---|---|---|---|
| [VARIABLE NAME 1] | [ADDRESS 1] | [ADDRESS 2] | [RESOURCE 1] | [FLAG 1] |
| [VARIABLE NAME 2] | [ADDRESS 3] | [ADDRESS 4] | [RESOURCE 2] | [FLAG 2] |
| ... | ... | ... | ... | ... |

FIG. 6

| VARIABLE NAME | STARTING ADDRESS | ENDING ADDRESS | RESOURCE | CONDITION FLAG | |
|---|---|---|---|---|---|
| b | L00001 | L00003 | r0 | 1 | 601 |
| a | L00002 | L00003 | r1 | 1 | 602 |
| b | L00004 | L00006 | r0 | 1 | 603 |
| a | L00005 | L00007 | r1 | 1 | 604 |
| a | L00008 | L00009 | r0 | 1 | 605 |

FIG. 7

|  |  |  |  |
|---|---|---|---|
|  | add | 10, R0 | ; ; . . 701 |
| L00003 |  |  |  |
|  | cmpgq | R0, R1, C0, C1 | ; ; . . 702 |
| L00004 |  |  |  |
|  | mov [C0] | 10, R0 | ; ; . . 704 |
| L00005 |  |  |  |
|  | mov [C0] | 20, R1 | ; ; . . 705 |
|  | : |  |  |
|  | add [C0] | 10, R0 | ; ; . . 706 |
| L00006 |  |  |  |
|  | add [C0] | −5, R1 | ; ; . . 707 |
| L00007 |  |  |  |
| L00008 |  |  |  |
|  | mov [C1] | 5, R0 | ; ; . . 709 |
|  | : |  |  |
|  | add [C1] | 15, R0 | ; ; . . 710 |
| L00009 |  |  |  |
|  | : |  |  |

FIG. 8

| VARIABLE NAME | STARTING ADDRESS | ENDING ADDRESS | RESOURCE | CONDITION FLAG | |
|---|---|---|---|---|---|
| b | L00001 | L00004 | R0 | 1 | ~801 |
| a | L00002 | L00004 | R1 | 1 | ~802 |
| b | L00004 | L00006 | R0 | C0 | ~803 |
| a | L00005 | L00007 | R1 | C0 | ~804 |
| a | L00008 | L00009 | R0 | C1 | ~805 |

FIG. 9

```
          add      10, R0        ;; ..901
L00003
          cmpgq    R0, R1, C0, C1 ;; ..902
L00004
          mov [C0] 10, R0        ;; ..903
L00005
          mov [C1] 5, R0         ;; ..904
L00006
          mov [C0] 20, R1        ;; ..905
            :
L00007
          add [C0] 10, R0        ;; ..906
L00008
          add [C0] -5, R1        ;; ..907
L00009
          add [C1] 15, R0        ;; ..908
L00010
            :
```

FIG. 10

| VARIABLE NAME | STARTING ADDRESS | ENDING ADDRESS | RESOURCE | CONDITION FLAG | |
|---|---|---|---|---|---|
| b | L00001 | L00004 | R0 | 1 | ←1001 |
| a | L00002 | L00004 | R1 | 1 | ←1002 |
| b | L00004 | L00008 | R0 | C0 | ←1003 |
| a | L00006 | L00009 | R1 | C0 | ←1004 |
| a | L00005 | L00010 | R0 | C1 | ←1005 |

FIG. 11

| | |
|---|---|
| DS | "b" |
| DD | L0001, L0004 |
| DD | RES_REG0 |
| DD | 1 |
| DS | "a" |
| DD | L0002, L0004 |
| DD | RES_REG1 |
| DD | 1 |
| DS | "b" |
| DD | L0004, L0008 |
| DD | RES_REG0 |
| DD | COND_REGC0 |
| DS | "a" |
| DD | L0006, L0009 |
| DD | RES_REG1 |
| DD | COND_REGC0 |
| DS | "a" |
| DD | L0005, L0010 |
| DD | RES_REG0 |
| DD | COND_REGC1 |

FIG. 12

| VARIABLE NAME | STARTING ADDRESS | ENDING ADDRESS | RESOURCE | CONDITION FLAG 1 | OPERATOR | CONDITION FLAG 2 |
|---|---|---|---|---|---|---|
| [VARIABLE NAME 1] | [ADDRESS 1] | [ADDRESS 2] | [RESOURCE 1] | [FLAG 1] | [OPERATOR 1] | [FLAG 2] |
| [VARIABLE NAME 2] | [ADDRESS 3] | [ADDRESS 4] | [RESOURCE 2] | [FLAG 3] | [OPERATOR 2] | [FLAG 4] |
| ... | ... | ... | ... | ... | ... | ... |

```
if ((b > 15) && (a > b + 10)) {
    b = 10;
    a = 20;
    :
    c = b + 10;
    d = a - 5;
} else {
    a = 5;
    :
    c = a + 15;
}
```

FIG. 14

|  |  |  |
|---|---|---|
| | cmp r0, 15 | ;; ..1401 |
| | blq L00008 | ;; ..1402 |
| | add 10, r0 | ;; ..1403 |
| L00003 | | |
| | cmp r0, r1 | ;; ..1404 |
| | blq L00008 | ;; ..1405 |
| L00004 | | |
| | mov 10, r0 | ;; ..1406 |
| L00005 | | |
| | mov 20, r1 | ;; ..1407 |
| | : | |
| | add 10, r0 | ;; ..1408 |
| L00006 | | |
| | add −5, r1 | ;; ..1409 |
| L00007 | | |
| | jmp L00009 | ;; ..1410 |
| L00008 | | |
| | mov 5, r0 | ;; ..1411 |
| | : | |
| | add 15, r0 | ;; ..1412 |
| L00009 | | |
| | : | |

FIG. 15

| VARIABLE NAME | STARTING ADDRESS | ENDING ADDRESS | RESOURCE | CONDITION FLAG 1 | OPERATOR | CONDITION FLAG 2 |
|---|---|---|---|---|---|---|
| b | L00001 | L00003 | r0 | 1 | - | 1 |
| a | L00002 | L00003 | r1 | 1 | - | 1 |
| b | L00004 | L00006 | r0 | 1 | - | 1 |
| a | L00005 | L00007 | r1 | 1 | - | 1 |
| a | L00008 | L00009 | r0 | 1 | - | 1 |

FIG. 16

|  |  |  |  |
|--|--|--|--|
| | cmpge | R0, 15, C0, C1 | ;; ..1601 |
| | add | 10, R0 | ;; ..1603 |
| L00003 | | | |
| | cmpge | R0, R1, C2, C3 | ;; ..1604 |
| L00004 | | | |
| | mov [C0&&C2] | 10, R0 | ;; ..1606 |
| L00005 | | | |
| | mov [C0&&C2] | 20, R1 | ;; ..1607 |
| | : | | |
| | add [C0&&C2] | 10, R0 | ;; ..1608 |
| L00006 | | | |
| | add [C0&&C2] | −5, R1 | ;; ..1609 |
| L00007 | | | |
| L00008 | | | |
| | mov [C1&&C3] | 5, R0 | ;; ..1611 |
| | : | | |
| | add [C1&&C3] | 15, R0 | ;; ..1612 |
| L00009 | | | |
| | : | | |

FIG. 17

| VARIABLE NAME | STARTING ADDRESS | ENDING ADDRESS | RESOURCE | CONDITION FLAG 1 | OPERATOR | CONDITION FLAG 2 |
|---|---|---|---|---|---|---|
| b | L00001 | L00003 | r0 | 1 | - | 1 |
| a | L00002 | L00003 | r1 | 1 | - | 1 |
| b | L00004 | L00006 | r0 | C0 | && | C2 |
| a | L00005 | L00007 | r1 | C0 | && | C2 |
| a | L00008 | L00009 | r0 | C1 | && | C3 |

FIG. 20

| | | | | |
|---|---|---|---|---|
| 0x40000013 | ADD | 10, R0 | ; ; | . . 2001 |
| 0x40000018 | CMPGQ | R0, R1, C0, C1 | ; ; | . . 2002 |
| 0x4000001D | MOV[C0] | 10, R0 | ; ; | . . 2003 |
| 0x40000022 | MOV[C1] | 5, R0 | ; ; | . . 2004 |
| 0x40000027 | MOV[C0] | 20, R1 | ; ; | . . 2005 |
| 0x4000002B | | | | |
| 0x40000041 | ADD[C0] | 10, R0 | ; ; | . . 2006 |
| 0x40000049 | ADD[C0] | −5, R1 | ; ; | . . 2007 |
| 0x4000004F | ADD[C1] | 15, R0 | ; ; | . . 2008 |
| 0x40000057 | CLR | R0 | | |

F I G. 2 1

| VARIABLE NAME | STARTING ADDRESS | ENDING ADDRESS | RESOURCE | CONDITION FLAG | |
|---|---|---|---|---|---|
| b | 0x40000008 | 0x40000018 | R0 | 1 | —2101 |
| a | 0x40000008 | 0x40000018 | R1 | 1 | —2102 |
| b | 0x4000001D | 0x40000041 | R0 | C0 | —2103 |
| a | 0x40000027 | 0x40000049 | R1 | C0 | —2104 |
| a | 0x40000022 | 0x4000004F | R0 | C1 | —2105 |

FIG. 22

| | | | |
|---|---|---|---|
| 0x40000013 | CMPGE | R0, 15, C0, C1 | ; ; .. 2201 |
| 0x40000018 | ADD | 10, R0 | ; ; .. 2202 |
| 0x4000001D | CMPGE | R0, R1, C2, C3 | ; ; .. 2203 |
| 0x40000022 | MOV [C0&&C2] | 10, R0 | ; ; .. 2204 |
| 0x40000027 | MOV [C1&&C3] | 5, R0 | ; ; .. 2205 |
| 0x4000002B | MOV [C0&&C2] | 20, R1 | ; ; .. 2206 |
| 0x40000041 | ADD [C0&&C2] | 10, R0 | ; ; .. 2207 |
| 0x40000049 | ADD [C1&&C3] | 15, R0 | ; ; .. 2208 |
| 0x4000004F | ADD [C0&&C2] | −5, R1 | ; ; .. 2209 |
| 0x40000057 | | | |

FIG. 23

| VARIABLE NAME | STARTING ADDRESS | ENDING ADDRESS | RESOURCE | CONDITION FLAG 1 | OPERATOR | CONDITION FLAG 2 | |
|---|---|---|---|---|---|---|---|
| b | 0x40000008 | 0x40000018 | r0 | 1 | - | 1 | 2301 |
| a | 0x40000008 | 0x40000018 | r1 | 1 | - | 1 | 2302 |
| b | 0x4000001D | 0x40000041 | r0 | C0 | && | C2 | 2303 |
| a | 0x40000027 | 0x40000049 | r1 | C0 | && | C2 | 2304 |
| a | 0x40000022 | 0x4000004F | r0 | C1 | && | C3 | 2305 |

FIG. 24

|  |  |  |  |
|---|---|---|---|
| : | | | |
| 0x40000013 | ADD | 10, R0 | ;; ..2401 |
| 0x40000018 | CMP | R0, R1 | ;; ..2402 |
| 0x4000001B | BLQ | 0x40000040 | ;; ..2403 |
| 0x4000001D | MOV | 10, R0 | ;; ..2404 |
| 0x40000022 | MOV | 20, R1 | ;; ..2405 |
| : | | | |
| 0x40000031 | ADD | 10, R0 | ;; ..2406 |
| 0x40000039 | SUB | −5, R1 | ;; ..2407 |
| 0x4000003E | BRA | 0x40000064 | ;; ..2408 |
| 0x40000040 | MOV | 5, R0 | ;; ..2409 |
| : | | | |
| 0x4000005F | ADD | 15, R0 | ;; ..2410 |
| 0x40000064 | CLR | R0 | ;; ..2411 |
| : | | | |

FIG. 25

| VARIABLE NAME | STARTING ADDRESS | ENDING ADDRESS | RESOURCE | |
|---|---|---|---|---|
| b | 0x40000008 | 0x40000018 | R0 | ～2501 |
| a | 0x40000008 | 0x40000018 | R1 | ～2502 |
| b | 0x4000001D | 0x40000031 | R0 | ～2503 |
| a | 0x40000022 | 0x40000039 | R1 | ～2504 |
| a | 0x40000040 | 0x4000005F | R0 | ～2505 |

FIG. 26

| | | | | |
|---|---|---|---|---|
| | : | | | |
| 0x40000013 | ADD | 10, R0 | ; ; | . . 2601 |
| 0x40000018 | CMPGQ | R0, R1, C0, C1 | ; ; | . . 2602 |
| 0x4000001D | MOV[C0] | 10, R0 | ; ; | . . 2603 |
| 0x40000022 | MOV[C1] | 5, R0 | ; ; | . . 2604 |
| 0x40000027 | MOV[C0] | 20, R1 | ; ; | . . 2605 |
| 0x4000002B | | | | |
| | : | | | |
| 0x40000041 | ADD[C0] | 10, R0 | ; ; | . . 2606 |
| 0x40000049 | ADD[C0] | −5, R1 | ; ; | . . 2607 |
| 0x4000004F | ADD[C1] | 15, R0 | ; ; | . . 2608 |
| 0x40000057 | CLR | R0 | ; ; | . . 2609 |
| | : | | | |

FIG. 27

| VARIABLE NAME | STARTING ADDRESS | ENDING ADDRESS | RESOURCE | |
|---|---|---|---|---|
| b | 0x40000008 | 0x40000018 | R0 | —2701 |
| a | 0x40000008 | 0x40000018 | R1 | —2702 |
| b | 0x4000001D | 0x40000041 | R0 | —2703 |
| a | 0x40000027 | 0x40000049 | R1 | —2704 |
| a | 0x40000022 | 0x4000004F | R0 | —2705 |

DEBUGGING METHOD AND DEBUGGING DEVICE

BACKGROUND OF THE INVENTION

1. Field of the Invention

The present invention relates to a compiler and a debugging device used for developing programs in an architecture having conditional instructions.

2. Description of the Related Art

Generally, debugging information generated by a compiler contains information used to associate the contents of a source program with the contents of the assembler code translated from it. Of these kinds of information, information on the variables appearing in the source program and the hardware resources (registers and memories) allocated to the variables is called the location information.

In the prior art, location information generated by a compiler has been made up of rows each corresponding to an entry carrying the name of a variable, the resource allocated to the variable, the address at which the resource is valid, and the address at which the resource is invalid.

When the source program shown in FIG. 2 is compiled by a compiler designed for a conventional architecture, the assembler code shown in FIG. 24 is obtained. At this time, the compiler generates, within an assembler file, debugging information containing location information such as shown in FIG. 25. For example, entry 2504 in the location information shown in FIG. 25 shows that a register R1 is assigned as a resource to a variable "a" in the address range from 0x40000022 to 0x40000039. In FIG. 24, 2401 to 2411 indicate assembler instructions, and in FIG. 25, 2501 to 2505 indicate the entries in the location information.

Using an assembler and a linker, an object file in executable form is generated from the assembler file containing the debugging information. A debugging device takes the object file as an input and executes it. While stopping the execution in a step execution mode or by using a breakpoint, the debugging device analyzes the debugging information in response to the user's display request for the contents of a variable, obtains the resource allocated to the variable from the name of the variable and the address at which the execution is stopped, and displays the stored value retrieved from the resource. For example, when the execution is stopped at address 0x4000002D during the debugging, and the user makes a request to the debugging device to display the contents of a variable "b", the debugging device searches the location information to locate the entry containing the current address 0x4000002D from among the entries for the variable "b". In the location information of FIG. 25, the entry 2503 corresponds to this entry. Next, resource information is retrieved from that entry to identify the resource allocated to the variable. The entry 2503 in the location information of FIG. 25 shows that the resource allocated to the variable "b" is register R0. The debugging device examines the value held in the resource (in this case, the register R0) and displays this value on the screen as the current value of the variable "b".

However, if location information similar to the one shown in FIG. 25 is used for a program compiled by a compiler designed for an architecture having conditional instructions, there are certain cases in which the debugging device cannot respond to a user request to display the contents of a variable. If the source program shown in FIG. 2 is complied by a compiler designed for an architecture having conditional instructions, the assembler code shown in FIG. 26 is obtained. Instructions 2603 to 2608 are conditional instructions. In this case, if location information is generated by the prior art debugging information generation method, the location information shown in FIG. 27 is obtained. In FIG. 26, 2601 to 2609 indicate assembler instructions, and in FIG. 27, 2701 to 2705 indicate the entries in the location information.

Suppose that the object file generated from the thus generated assembler code is read into a debugging device for execution, and that, for example, at address 0x4000002B, the user makes a request to the debugging device to display the contents of the variable "a". In this case, the debugging device searches through the entries for the variable "a" in the location information of FIG. 27, trying to find the entry containing the address 0x4000002B, but in the example shown, two entries 2704 and 2705 are located. As a result, the debugging device cannot determine which of the registers, R0 or R1, is the resource allocated to the variable "a", and thus it cannot correctly respond to the user' request to display the contents of the variable.

SUMMARY OF THE INVENTION

It is an object of the present invention to provide a compiler and a debugging device that allow the contents of any requested variable to be referenced correctly.

A first compiler according to the present invention is a compiler which takes a source program as an input, and generates an object program for output by performing syntax analysis, optimization and resource allocation, and scheduling, the compiler comprising: life range information acquiring means for acquiring, for each life range of any variable appearing in the source program, information made up of elements showing the name of the variable, an address range within which the variable can be referenced in the object program, and a resource allocated to the variable within the address range; condition acquiring means for finding from among the life ranges any life range that contains any instruction to which a condition flag has been appended as a result of if-conversion optimization, and for acquiring the condition flag appended to the instruction; address range acquiring means for acquiring the address range for any life range in which the address range has been changed as a result of scheduling; and location information outputting means for outputting location information made up of elements showing the name of the variable, the address range finally acquired, the resource, and the condition flag.

A second compiler according to the present invention is a compiler which takes a source program as an input, and generates an object program for output by performing syntax analysis, optimization and resource allocation, and scheduling, the compiler comprising: life range information acquiring means for acquiring, for each life range of any variable appearing in the source program, information made up of elements showing the name of the variable, an address range within which the variable can be referenced in the object program, and a resource allocated to the variable within the address range; condition flag acquiring means for finding from among the life ranges any life range that contains any instruction to which an conditional expression has been appended as a result of if-conversion optimization, and for acquiring two condition flags forming the appended conditional expression; operator acquiring means for acquiring an operator contained in the conditional expression; address range acquiring means for acquiring the address range for any life range in which the address range has been changed as a result of scheduling; and location information outputting means for outputting location information made up of elements showing the name of the variable, the address range finally acquired, the resource, the two condition flags, and the operator.

A first debugging device according to the present invention is a debugging device which takes, as an input, location information acquired for each life range of any variable appearing in a source program, the location information being made up of elements showing the name of the variable, an address range within which the variable can be referenced in the object program, a resource allocated to the variable within the address range, and a condition flag appended when the resource is allocated to the variable within the address range, and which allows the contents of any variable appearing in the source program to be referenced during the execution thereof, the debugging device comprising: location information searching means for searching for location information corresponding to any variable within whose address range a current address is contained; condition examining means for extracting the element showing the condition flag from the location information searched for by the location information searching means, and for examining a value currently held by the condition flag; resource examining means for extracting the element showing the resource from the location information when the value of the condition flag obtained by the condition examining means is true, and for examining a value currently held in the resource; and variable contents outputting means for displaying the value obtained by the resource examining means as the value held in the variable.

A second debugging device according to the present invention is a debugging device which takes, as an input, location information acquired for each life range of any variable appearing in a source program, the location information being made up of elements showing the name of the variable, an address range within which the variable can be referenced in the object program, a resource allocated to the variable within the address range, and two condition flags and an operator forming an conditional expression appended when the resource is allocated to the variable within the address range, and which allows the contents of any variable appearing in the source program to be referenced during the execution thereof, the debugging device comprising: location information searching means for searching for location information corresponding to any variable within whose address range a current address is contained; condition flag examining means for extracting the elements showing the two condition flags from the location information searched for by the location information searching means, and for examining values currently held by the two condition flags; conditional expression evaluating means for extracting the element showing the operator from the location information searched for by the location information searching means, and for evaluating the value of the conditional expression consisting of the two condition flags and the operator; resource examining means for extracting the element showing the resource from the location information when the value of the conditional expression evaluated by the conditional expression evaluating means is true, and for examining a value currently held in the resource; and variable contents outputting means for displaying the value obtained by the resource examining means as the value held in the variable.

By generating the location information using the first compiler, and by inputting the generated location information to the first debugging device, the contents of the variable can be referenced correctly.

Likewise, by generating the location information using the second compiler, and by inputting the generated location information to the second debugging device, the contents of the variable can be referenced correctly.

BRIEF DESCRIPTION OF THE DRAWINGS

FIG. 1 is a diagram showing the configuration of a compiler according to an embodiment of the present invention.

Figure 2:
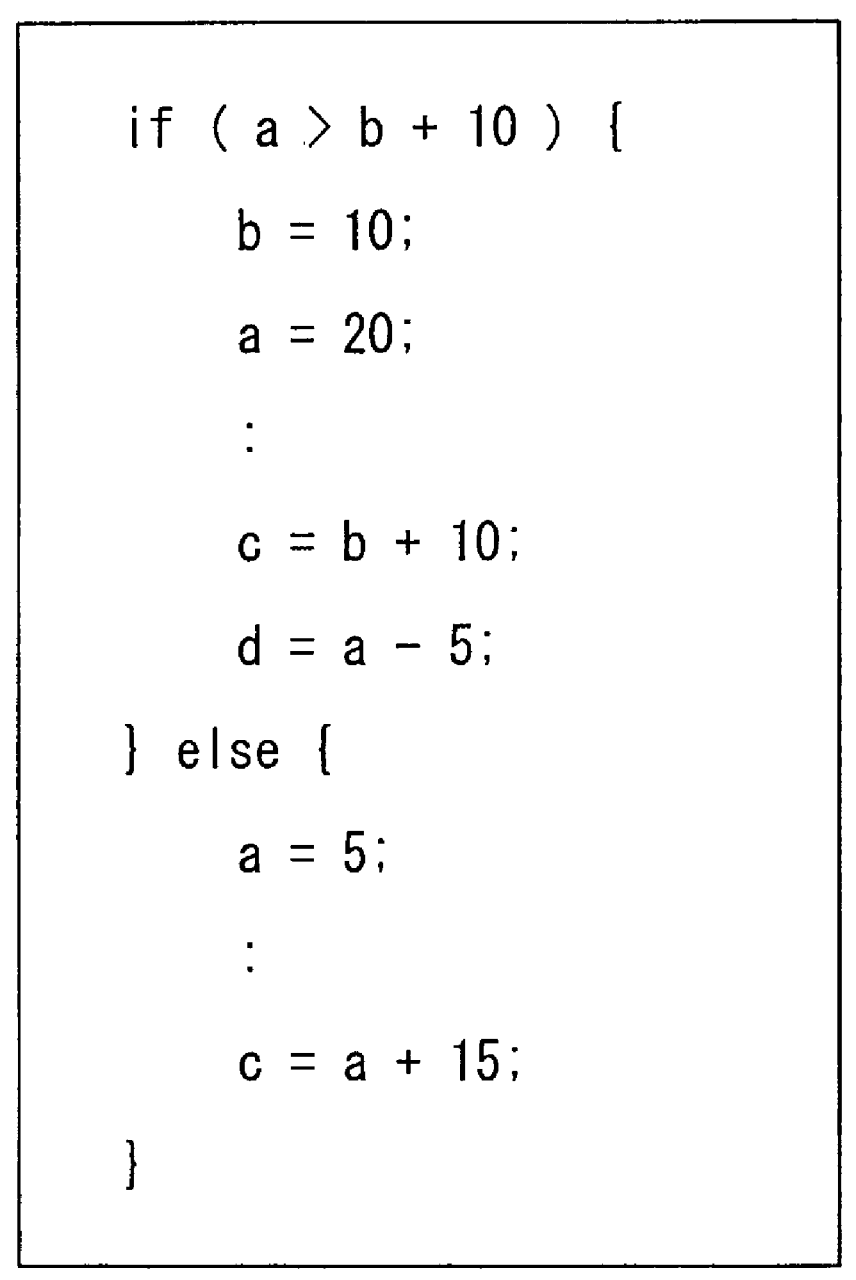

FIG. 2 is a diagram showing an example of a source program written in the C language.

FIG. 3 is a diagram showing intermediate code which a syntax analyzing means generates by taking the program of FIG. 2 as the source program.

FIG. 5 is a diagram showing the structure of location information for a first case according to the embodiment of the present invention.

FIG. 6 is a diagram showing location information for the intermediate code shown in FIG. 3 which is translated from the source program shown in FIG. 2.

FIG. 7 is a diagram showing intermediate code which is obtained as a result of optimization and resource allocation performed on the intermediate code shown in FIG. 3.

FIG. 8 is diagram showing location information for the intermediate code shown in FIG. 7.

FIG. 9 is a diagram showing intermediate code which is obtained as a result of scheduling performed on the intermediate code shown in FIG. 7.

FIG. 10 is diagram showing location information for the intermediate code shown in FIG. 9.

FIG. 11 is a diagram showing the location information of FIG. 10 converted into an assembler program form by an assembler code generating means.

FIG. 12 is a diagram showing the structure of location information for a second case according to the embodiment of the present invention.

Figure 13:
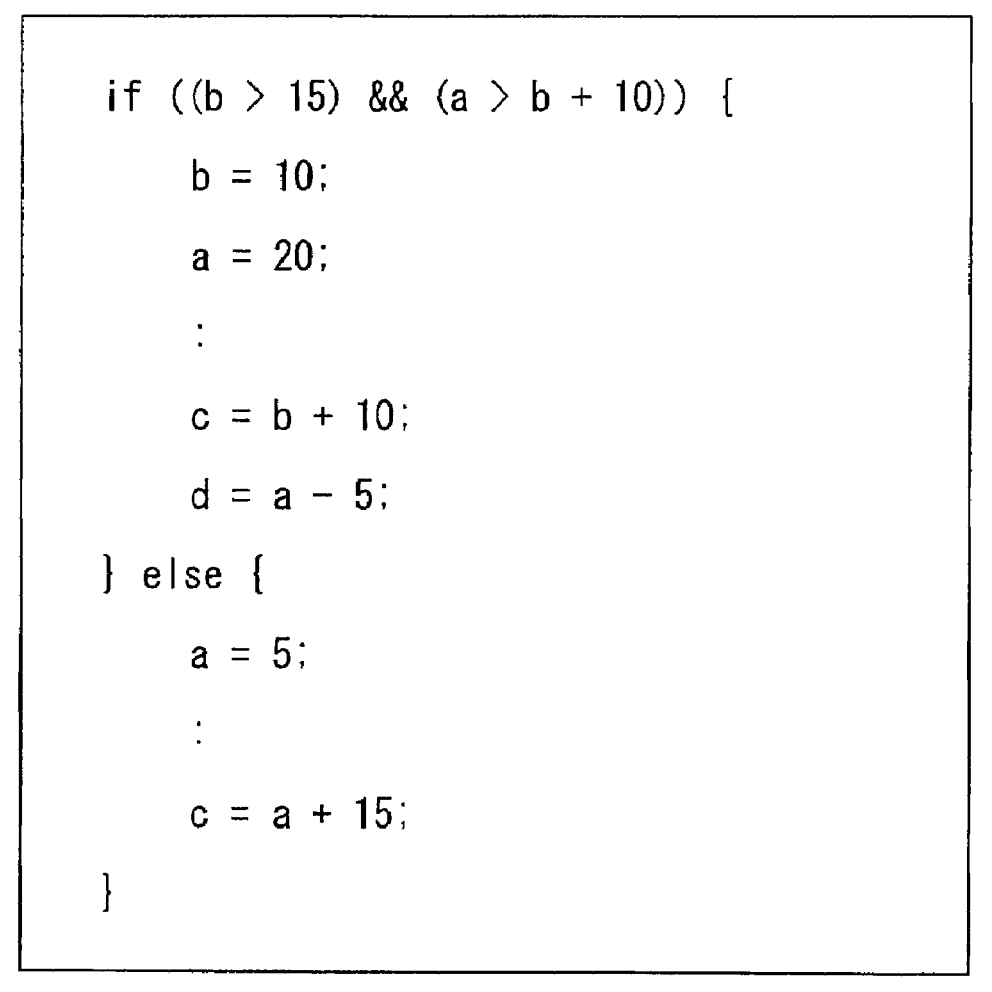

FIG. 13 is a diagram showing a second example of a source program written in the C language.

FIG. 14 is a diagram showing intermediate code which the syntax analyzing means generates by taking the program of FIG. 13 as the source program.

FIG. 15 is a diagram showing location information for the intermediate code shown in FIG. 14 which is translated from the source program shown in FIG. 13.

FIG. 16 is a diagram showing intermediate code which is obtained as a result of optimization and resource allocation performed on the intermediate code shown in FIG. 14.

FIG. 17 is diagram showing location information for the intermediate code shown in FIG. 16.

FIG. 20 is a diagram showing an example of assembler code obtained by compiling the program of FIG. 2 by a parallelizing compiler.

FIG. 21 is diagram showing location information for the assembler code shown in FIG. 20.

FIG. 22 is a diagram showing an example of assembler code translated by a compiler from the program shown in FIG. 13.

FIG. 23 is a diagram showing location information for the assembler code shown in FIG. 22 which is translated from the source program shown in FIG. 13.

FIG. 24 is a diagram showing an example of assembler code generated by a prior art compiler from the program shown in FIG. 2.

FIG. 25 is a diagram showing location information for the assembler code shown in FIG. 24 which is translated from the source program shown in FIG. 2.

FIG. 26 is a diagram showing an example of assembler code obtained by compiling the program of FIG. 2 by a parallelizing compiler.

FIG. 27 is a diagram showing location information for the assembler code shown in FIG. 26 which is translated from the source program shown in FIG. 2.

DETAILED DESCRIPTION OF THE PREFERRED EMBODIMENTS

Figure 4:
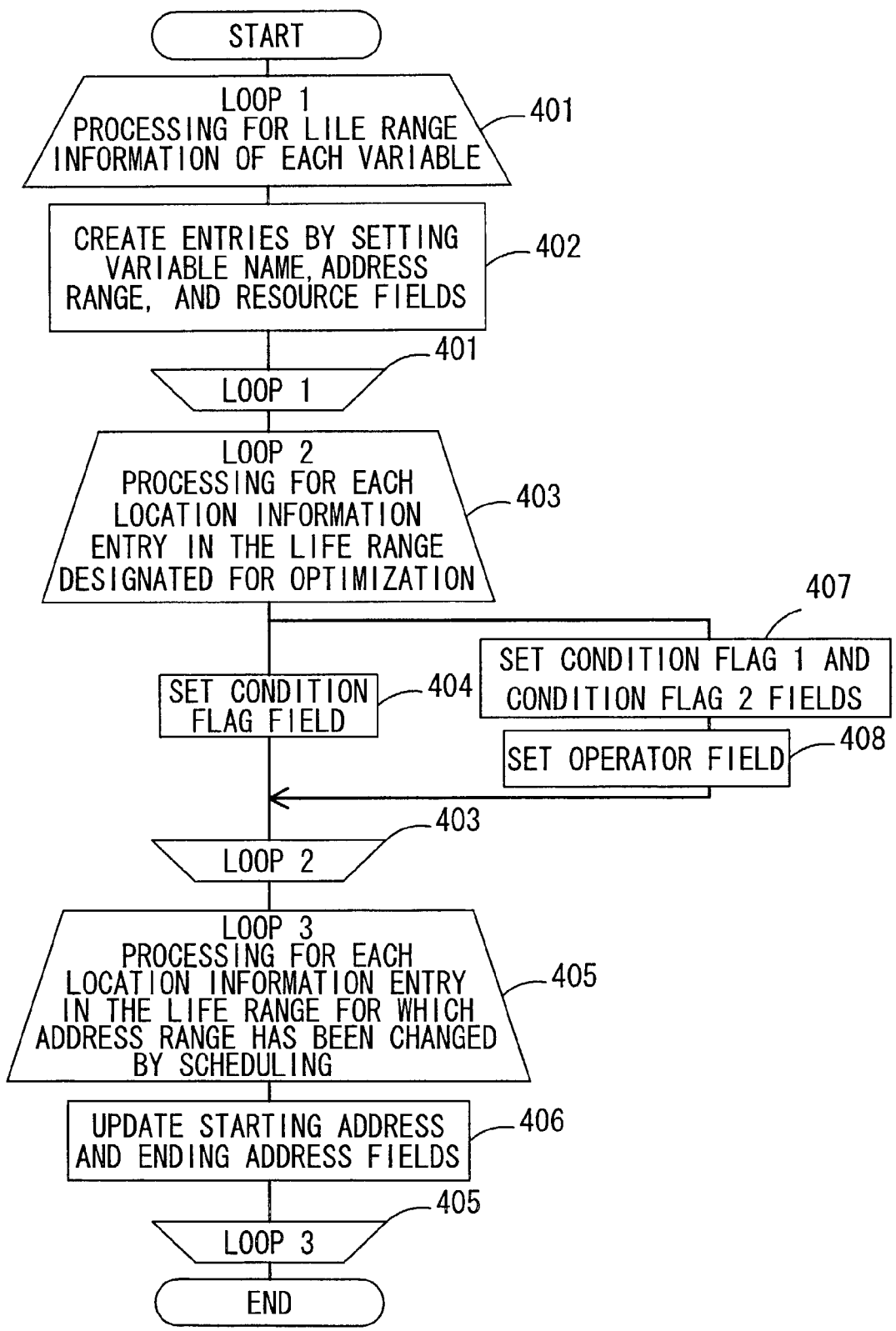
FIG. 4 is a flowchart illustrating a location information generating procedure for a debugging information generating means.

Embodiments of the present invention will be described below.

[Terminology]

First, the terms used herein will be described.

"Processor"

The processor for which the compiler is intended may be either of a single instruction issuing type or of a multiple instruction simultaneous issuing type, and comprises, as in a conventional processor, an instruction memory, a program counter, an instruction fetch circuit, an instruction register, an instruction decoder, an arithmetic unit, general-purpose registers, a data memory, and a data/address transfer bus.

"Conditional Instruction"

It should be understood that an execution condition flag can be appended to a processor instruction. The condition flag is a register that can have a true or false value. The condition flag is specified as an operand of a compare instruction, and it's value varies according to the result of the compare operation. As for the operation of a conditional instruction, when the value of the specified condition flag is true, that instruction is issued, and when the value is false, an instruction that executes nothing is issued.

"If-Conversion"

One of optimization techniques used in compilers for architectures having conditional instructions, if-conversion optimization is applied to an if statement (conditional branch statement) structure in the C language. An if statement consists of a condition part, a then part which is executed if the result of the condition part is true, and an else part which is executed if the result of the condition part is false. A conventional compiler outputs assembler code with the then part and the else part as respective basic blocks, but in the if-conversion optimization performed in an architecture having conditional instructions, the branch instruction for implementing the if statement structure is deleted, and the then part and the else part are structured into one basic block, and output as assembler code by converting the instructions contained in the then part and the else part into a conditional instruction. In this way, the branch instruction can be eliminated in the assembler code generation of the if statement.

Embodiments of the present invention will be described with reference to drawings.

FIG. 1 is a diagram showing the configuration of a compiler according to an embodiment of the present invention. As shown, the compiler 1 comprises a syntax analyzing means 102, an optimizing and resource allocating means 103, a scheduling means 104, an assembler code generating means 105, an intermediate code managing means 106, and a debugging information generating means 107. The compiler 1 takes a source program 101 as an input, and outputs an object program 108 as assembler code.

The syntax analyzing means 102 takes the source program 101 as an input, performs the lexical, syntax, and semantic analyses of the program, and outputs an intermediate code program. The intermediate code program is stored in the intermediate code managing means 106 described hereinafter. Debugging information for the intermediate code is generated by and held in the debugging information generating means 107 described hereinafter. For example, when the syntax analyzing means 102 is operated by inputting the source program of FIG. 2, intermediate code such as shown in FIG. 3 is stored in the intermediate code managing means 106. In FIG. 3, 301 to 310 indicate intermediate instructions. Symbols r0, r1, and r2 in the intermediate code are not real registers in the processor, but virtual registers in the intermediate code.

The optimizing and resource allocating means 103 performs optimizations, such as removal of unnecessary code, convolution of constants, and optimization of induction variables, to reduce code size and increase execution speed. The if-conversion optimization which is effective in the present invention is also performed here. These optimizations are applied to the intermediate code program stored in the intermediate code managing means 106 described hereinafter. In order that the state of the intermediate code modified as a result of optimization may be reflected into the debugging information held in the debugging information generating means 107, the debugging information generating means 107 is notified accordingly. In response, the debugging information generating means 107 updates the debugging information stored therein.

The scheduling means 104 performs scheduling by taking as an input the intermediate code program held in the intermediate code managing means 106 described hereinafter. It also notifies the debugging information generating means 107 of the state of the intermediate code modified as a result of scheduling. In response, the debugging information generating means 107 updates the debugging information stored therein.

The intermediate code held in the intermediate code managing means 106 described hereinafter is converted into assembler code by the assembler code generating means 105. The debugging information stored in the debugging information generating means 107 described hereinafter is output as a data sequence for incorporation into the assembler code.

The intermediate code managing means 106 receives the intermediate code program from the syntax analyzing means 102 and stores it. The intermediate code managing means 106 provides the stored intermediate code program to the optimizing and resource allocating means 103 and the scheduling means 104, and receives the processed intermediate code program for storing therein. The stored intermediate code program is provided to the assembler code generating means 105.

The debugging information generating means 107 generates and stores the debugging information as the intermediate code is generated and optimized by the syntax analyzing means 102, optimizing and resource allocating means 103, and scheduling means 104. The debugging information to be managed includes, in addition to the location information, line number information for associating each assembler instruction with a line number in the source program, information on the names and types of the functions and variables appearing in the source program, etc. The following description deals only with the location information which is a major concern of the present invention.

FIG. 4 is a flow chart illustrating a location information generating procedure for the debugging information generating means 107. A step-by-step description will be given below. The procedure will be described for two cases, that is, the processing within the loop in step 403 follows the branch to step 404 in the first case and the branch to steps 407 and 408 in the second case.

In the first case, the location information has a structure such as shown in FIG. 5, in which each row of information consists of fields for a variable name 501, a starting address 502, an ending address 503, a resource 504, and a condition flag 505.

Step 401 forms a loop in which information on a variable, the starting address of the life range of the variable, the ending address of the life range, and the resource allocated within the life range (hereinafter collectively referred to as the life range information) is obtained from the syntax analyzing means 102, and location information entries are generated for the respective pieces of information. The life range of a variable refers to the interval from the time that the value of the variable is defined to the time that the variable holding that value is last referenced.

In step 402, the location information entries are generated by obtaining the life range information from the syntax analyzing means 102. In a specific method of generation, the variable name carried in the life range information is entered into the variable name field 501, the starting address in the life range information is entered into the starting address field 502, the ending address in the life range information is entered into the ending address field 503, and the allocated resource in the life range information is entered into the resource field 504. The condition flag field 505 is set to "1", indicating that the life range is valid regardless of the state of the condition flag.

Step 403 forms a loop in which the life range information of the variable to which optimization has been applied is obtained from the optimizing and resource allocating means 103, and the contents of the location information entries are updated for the respective pieces of information.

In step 404, the stored location information is updated based on the optimized life range information of the variable obtained from the optimizing and resource allocating means 103. If a condition flag has been appended to any instruction in the life range as a result of processing such as the if-conversion optimization, the condition flag is set in the condition flag field 505.

Step 405 forms a loop in which the information on the life range of the variable for which the address range has been changed as a result of scheduling is obtained from the scheduling means 104, and the contents of the location information entries are updated for the respective pieces of information.

In step 406, the starting address field 502 and ending address field 503 of the location information are updated by obtaining from the scheduling means 104 the information on the life range of the variable for which the address range has been changed as a result of scheduling.

As the second case, consider the case in which the conditions that a conditional instruction can have are defined by a conditional expression comprising two condition flags and a dyadic operator (&& or ||). In this case, the location information has a structure such as shown in FIG. 12, in which each row of information consists of fields for a variable name 1201, a starting address 1202, an ending address 1203, a resource 1204, a first condition flag 1205, an operator 1206, and a second condition flag 1207. The procedure is the same as that for the first case, except that the processing within the loop in step 403 follows the branch to steps 407 and 408.

In step 407, the life range information of the variable in which a conditional expression has been appended to any instruction within the life range as a result of processing such as the if-conversion optimization is obtained from the optimizing and resource allocating means 103, and the two condition flags contained in the conditional expression are set in the first condition flag field 1205 and second condition flag field 1207, respectively, of the location information.

In step 408, the operator contained in the conditional expression is set in the operator field 1206 of the location information for the variable corresponding to the life range of the variable in which the conditional expression has been appended as a result of optimization.

Figure 18:
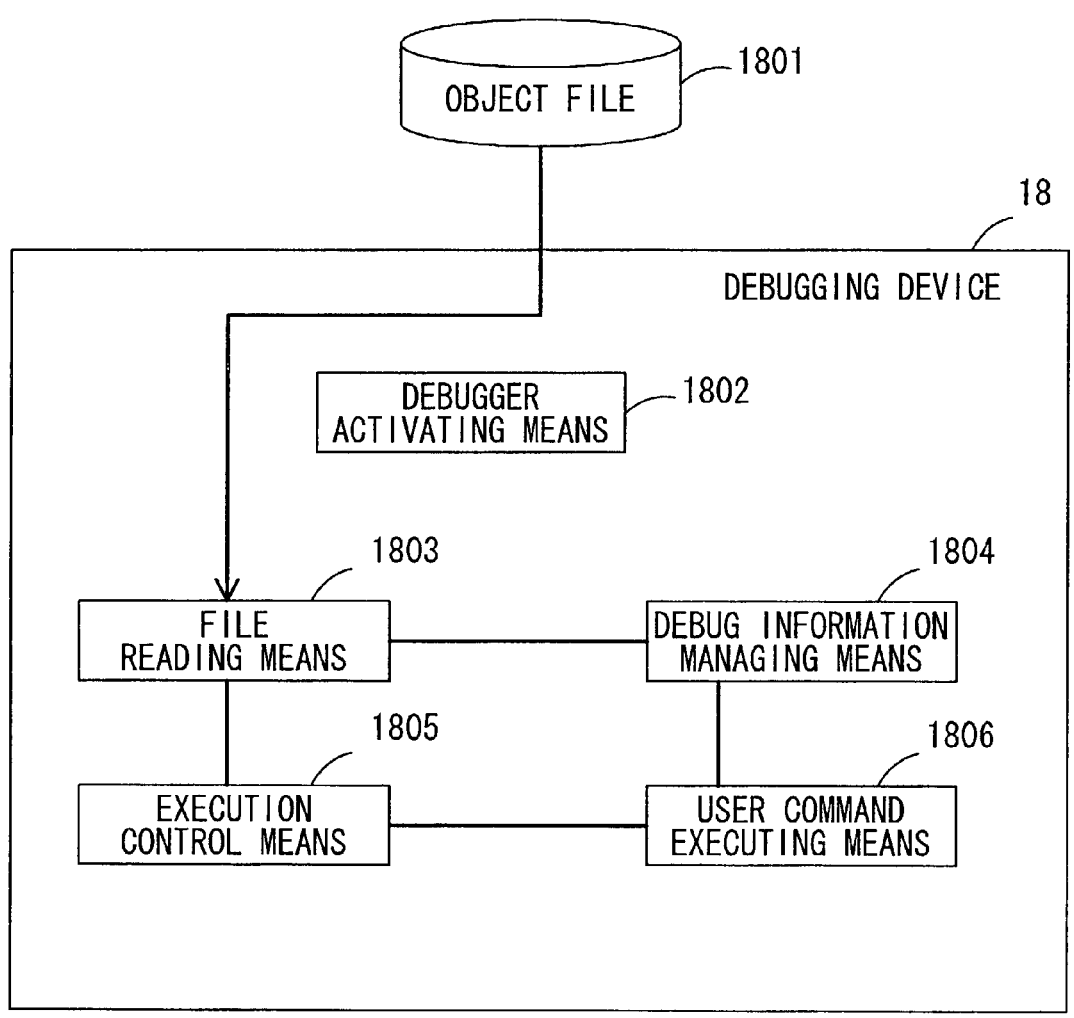
FIG. 18 is a diagram showing the configuration of a debugging device according to an embodiment of the present invention.

FIG. 18 is a diagram showing the configuration of a debugging device according to an embodiment of the present invention. The debugging device 18 comprises a debugger activating means 1802, a file reading means 1803, a debugging information managing means 1804, an execution control means 1805, and a user command executing means 1806.

When an activate command is input, the debugging device is activated by the debugger activating means 1802, and an emulator, simulator, etc. are selected according to the target environment specified by the user.

The file reading means 1803 reads an object file 1801, output by a linker, into the debugging device. Program and data contained in the object file 1801 are loaded into memory, and the debugging information is passed to the debugging information managing means 1804 hereinafter described.

The debugging information managing means 1804 receives the debugging information contained in the object file from the file reading means 1803, analyzes the debugging information, and responds to various information requests issued from the user command executing means 1806 hereinafter described. The debugging information held in the debugging information managing means 1804 includes, in addition to the location information, line number information for associating each assembler instruction with a line number in the source program, information on the names and types of the functions and variables appearing in the source program, etc. The following description deals only with the location information which is a major concern of the present invention.

The execution control means 1805 manages breakpoints and the execution state of the program (execution start/stop) on each target such as an emulator, simulator, etc.

The user command executing means 1806 performs processing to accept a command from the user and return the result of its execution when the program execution is suspended by the execution control means 1805. The user command executing means 1806 supports a group of commands, such as a breakpoint set command, a source display command, a disassemble display command, a symbol name display command, and a variable contents display command. The following description deals only with the variable contents display command which is a major concern of the present invention.

Figure 19:
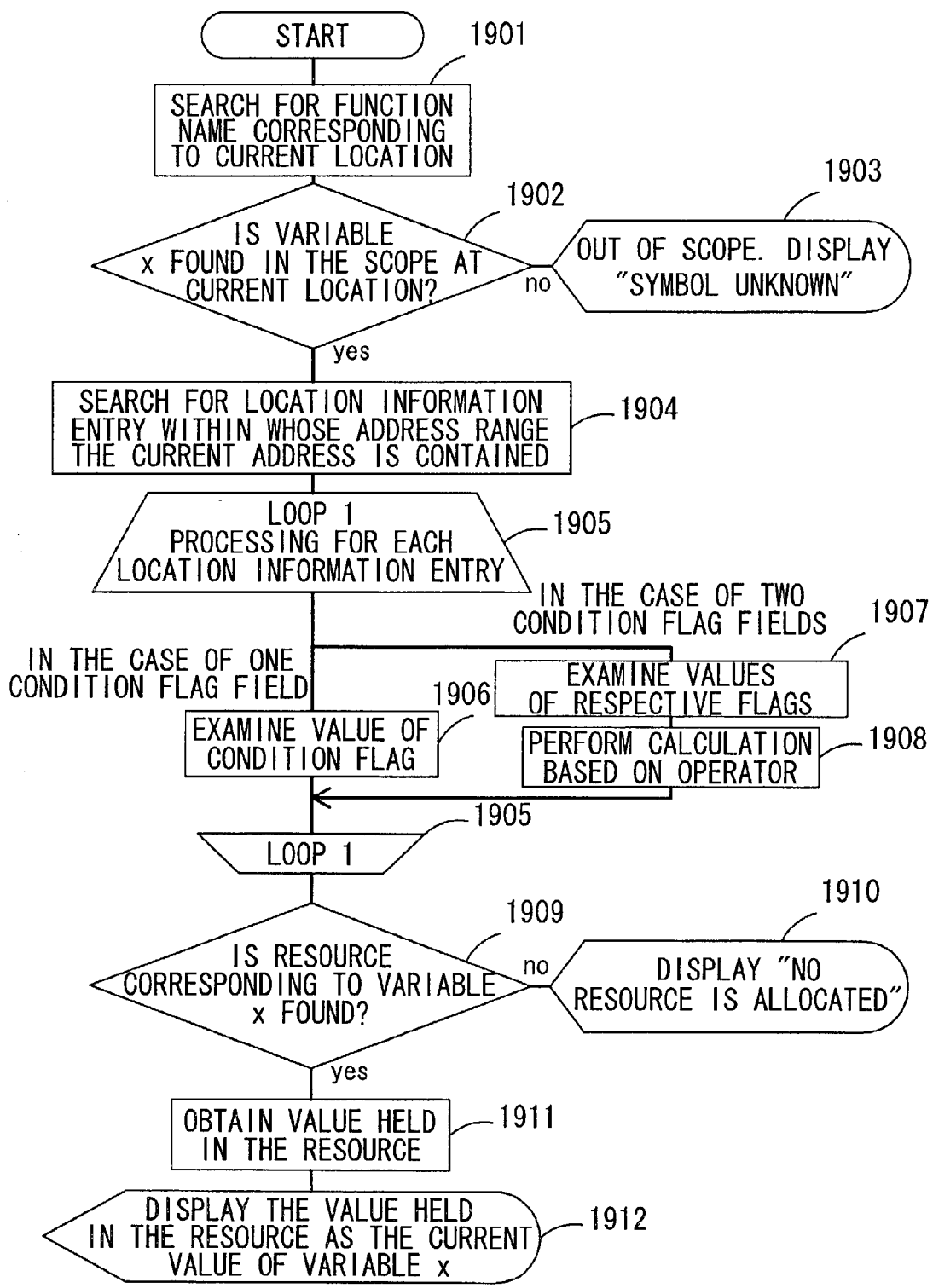
FIG. 19 is a flow chart illustrating a procedure that a user command executing means follows when displaying the contents of a variable.

FIG. 19 is a flow chart illustrating a procedure that the user command executing means 1806 follows when executing the variable contents display command. A step-by-step description will be given below. Here, the name of the variable whose contents are to be displayed is assumed to be x.

In step 1901, the source file of the source program, the function, and the line that correspond to the current address are obtained. The scope in the location information is thus determined.

In step 1902, it is determined whether the variable x whose contents are to be referenced is found in the current scope. To determine this, the location information held in the debugging information managing means 1804 is searched to see if the location information entry for the variable x exists in the location information within the current scope. If the information on the variable x is found, it is determined that the variable x can be referenced, and the process proceeds to step 1904; on the other hand, if the information on the variable x is not found, it is determined that the variable x cannot be referenced, and the process proceeds to step 1903.

In step 1903, a message is displayed indicating that the variable x cannot be referenced at the current address, and the processing of the variable contents display command is terminated.

In step 1904, search is made for the location information entry corresponding to the variable x at the current address. In a specific search method, the location information entries corresponding to the variable x searched for in step 1902 are searched to search for any entry whose address range defined by the starting and ending addresses contains the current address.

Step 1905 forms a loop in which the condition flag field of each location information entry found as a result of the location information searching in step 1904 is evaluated to search for a valid entry. In the case in which the location information entry has only one condition flag field (the first case), the evaluation is made in step 1906, while in the case in which the location information entry has two condition flag fields (the second case), the evaluation is made in steps 1907 and 1908 (this will be described later).

In step 1906, the condition flag value carried in the condition flag field 505 of the location information entry is examined, and if the value of the condition flag is true, the entry is reserved as a candidate; on the other hand, if the value is false, the entry is determined to be not a candidate and is discarded.

In step 1909, if the corresponding location information entry is found in the loop of step 1905, the process proceeds to step 1911; otherwise, the process proceeds to step 1910.

In step 1910, a message is displayed indicating that no resource is allocated to the variable x at the current location, and the processing of the variable contents display command is terminated.

In step 1911, the value stored in the resource in the location information searched for in the loop of step 1905 is examined.

In step 1912, the value examined in step 1911 is displayed as the value of the variable x.

As the second case, consider the case in which the conditions that a conditional instruction can have are defined by a conditional expression comprising two condition flags and a dyadic operator (&& or ||) (see the location information shown in FIG. 12). The procedure for this case is the same that for the first case, except that the processing within the loop in step 1905 follows the branch to steps 1907 and 1908.

In step 1907, the condition flag values carried in the first condition flag field 1205 and the second condition flag field 1207, respectively, are examined.

Instep 1908, based on the two condition flag values examined in step 1907, a calculation is performed using the operator specified in the operator field 1206; if the result of the calculation is true, the entry is reserved as a candidate, but if the result is false, the entry is determined to be not a candidate and is discarded.

[Description of Operation]

The operation of the component elements characteristic of the present invention will be described below by taking specific examples of the source program and assembler code.

First, a description will be given for the first case by taking the source program of FIG. 2 as an example. When the source program is input to the compiler 1, first the syntax analyzing means 102 is invoked. The syntax analyzing means 102 generates the intermediate code shown in FIG. 3 and stores it in the intermediate code managing means 106. On the other hand, the debugging information generating means 107 generates the debugging information such as the location information shown in FIG. 6 and stores the generated information (steps 401 and 402). In FIG. 6, 601 to 605 indicate location information entries.

Next, the optimizing and resource allocating means 103 is invoked. When optimization is applied to the intermediate code of FIG. 3 stored in the intermediate code managing means 106, the if-conversion optimization is applied and, after that, resources are allocated to the registers in the intermediate code. The result is the intermediate code shown in FIG. 7, and this intermediate code is stored back into the intermediate code managing means 106. In FIG. 7, 701 to 710 indicate intermediate instructions. In the intermediate code shown in FIG. 7, the instruction 702 (cmpgq R0, R1, C0, C1) compares the contents of the registers R0 and R1, and sets the condition flag C0 true and the condition flag C1 false if the contents of the register R0 are not less than the contents of the register R1, otherwise it sets the condition flag C0 false and the condition flag C1 true. The instruction 704 (mov [C0] 10, R0) loads value 10 into the register R0 only when the value of the condition flag C0 is true. As a result of the optimization, the branch instructions 303 and 308 are removed, and a condition flag is appended to the instructions 304, 305, etc. As the optimization and resource allocation operations are applied to the intermediate code, the debugging information generating means 107 updates the stored debugging information (step 403). In the resource field, each virtual register in the intermediate code is changed to the real resource allocated as a result of the resource allocation and, at the entries within the address ranges containing the instructions to which the respective condition flags have been added, the corresponding condition flag is set in the condition flag field (step 404). In the illustrated example, since the respective condition flags have been appended to the instructions in the address ranges indicating the life ranges of the variables at the entries 603, 604, and 605 out of the location information entries shown in FIG. 6, the corresponding condition flags are set in the condition flag fields at the respective entries. The resulting location information corresponding to the intermediate code of FIG. 7 is shown in FIG. 8. In FIG. 8, 801 to 805 indicate the entries in the location information.

Next, the scheduling means 104 is invoked. Here, scheduling is performed on the intermediate code of FIG. 7 stored in the intermediate code managing means 106. As a result, the intermediate code shown in FIG. 9 is obtained and is stored back into the intermediate code managing means 106. In FIG. 9, 901 to 908 indicate intermediate instructions. As the scheduling is done, the debugging information generating means 107 updates the stored debugging information (steps 405 and 406). The location information corresponding to the intermediate code of FIG. 9 is shown in FIG. 10. In FIG. 10, 1001 to 1005 indicate the entries in the location information.

Next, the assembler code generating means 105 is invoked. Here, the intermediate code of FIG. 9 stored in the intermediate code managing means 106 and the debugging information stored in the debugging information generating means 107, including the location information shown in FIG. 10, are output as an assembler program (object program 108). In the illustrated example, the intermediate code program has a one-to-one correspondence with the assembler program, and is therefore output as is. The debugging information, including the location information, is incorporated into the assembler program in a manner such as shown in FIG. 11.

With the above processing, the assembler program is generated from the source program of FIG. 2. The assembler program is then processed by an assembler and a linker to generate an object file ready to be loaded into the debugging device. The following describes the process for inputting the object file to the debugging device for program execution and the operation characteristic of the present invention.

When initial setup is completed by the debugger activating means 1802, the debugging device 18 is ready to accept a command from the user. When the user enters an object file read command, the file reading means 1803 is invoked. Here, the program, data, and debugging information are extracted from the object file 1801, and the program and data are loaded into memory, while the debugging information is stored into the debugging information managing means 1804. FIG. 20 shows a disassemble image of the program loaded into the memory when the object file 1801 is read into the debugging device 18. In FIG. 20, 2001 to 2008 are assembler instructions. In the debugging information managing means 1804, data of binary form passed from the file reading means 1803 is restored to the original debugging information. Shown in FIG. 21 is the location information stored in the debugging information managing means 1804 when the object file 1801 is read into the debugging device 18. In FIG. 21, 2101 to 2105 indicate the entries in the location information.

When the execution of the program is started by the user, and the execution is stopped at a breakpoint or by a stop request from the user, the debugging device is put in a user command wait state. Here, suppose that the execution of the program is stopped at address 0x4000002B in the assembler program shown in FIG. 20, and that the value of the condition flag C0 is false and the value of the condition flag C1 is true.

Operation will be described below with reference to the flow chart of FIG. 19 by taking as an example the case in which a variable reference command from the user, requesting to reference the variable "a", is input to the user command executing means 1806.

First, the source file of the source program, the function, and the line that correspond to the current address are obtained to determine the scope in the location information (step 1901).

Next, it is determined whether information on the variable "a" is found in the location information held in the debugging information managing means 1804 (step 1902). Since there are three entries for the variable "a" in the location information shown in FIG. 21, the yes branch is followed to proceed to step 1904.

Next, search is made through the entries for the variable "a" in the location information held in the debugging information managing means 1804 to search for any entry whose address range defined by the starting and ending addresses contains the current address (step 1904). The entries 2104 and 2105 are each the entry whose address range contains the address 0x4000002B. Then, these entries are examined to see whether there is any entry in which the condition flag value carried in the condition flag field is true (step 1905). Since the condition flag C1 is true, the entry 2105 corresponds to such an entry (step 1906).

Then, the value of the register R0, the resource specified in the resource field of the entry 2105, is examined (step 1911). That value is displayed as the value of the variable "a" (step 1912).

Next, a description will be given for the second case by taking specific examples of the source program and assembler code.

The intermediate code program generated by the syntax analyzing means 102 from the source program of FIG. 13 is shown in FIG. 14, and the location information is shown in FIG. 15. Here, when the if-conversion is applied by the optimizing and resource allocating means 103, a conditional expression comprising condition flags and an operator is appended to some of the instructions. The resulting intermediate code is shown in FIG. 16; as shown, a conditional expression having two condition flags is appended to some of the instructions. For each location information entry for the variable within whose address range any instruction with the conditional expression appended thereto is contained (step 403), the two condition flags contained in the appended conditional expression are stored in the first condition flag field and the second condition flag field, respectively (step 407). The operator contained in the conditional expression is stored in the operator field (step 408). The resulting location information is shown in FIG. 17. In FIG. 14, 1401 to 1412 indicate intermediate instructions, and in FIG. 16, 1601 to 1612 indicate intermediate instructions.

The operation of the debugging device will be described for the case where the object file thus obtained by compiling is input to the debugging device for execution and the contents of a variable is referenced in the process of the execution.

The object file is read into the debugging device 18; here, it is assumed that the execution of the program is stopped at address 0x4000002B in the assembler program shown in FIG. 22, and that the values of the condition flags C0, C1, C2, and C3 are false, true, false, and true, respectively. In FIG. 22, 2201 to 2209 indicate assembler instructions. The description will be given by taking as an example the case in which a variable reference command from the user, requesting to reference the variable "a", is input to the user command executing means 1806. The procedure up to step 1904 is the same as that for the first case; as a result, of the location information entries 2301 to 2305 shown in FIG. 23, the entries 2304 and 2305 survived as the entries to be examined.

For each of these entries (step 1905), the values of the first condition flag and second condition flag fields are examined (step 1907), which are false and false, respectively, for the entry 2304 and true and true, respectively, for the entry 2305. Then, the value of the conditional expression having the values of the two condition flags and the operator (&&: logical multiplication operator) stored in the operator field is evaluated (step 1908); the result is false for the entry 2304 and true for the entry 2305. That is, the entry 2305 is the desired entry (step 1909). Then, the value of the register R0, the resource specified in the resource field of the entry 2305, is examined (step 1911). That value is displayed as the value of the variable "a" (step 1912).

As described above, by using the compiler and the debugging device according to the embodiment, the contents of any requested variable can be referenced correctly on the debugging device. That is, the contents of any requested variable can be referenced correctly by inputting the location information generated by the compiler of the invention into the debugging device of the invention designed for an architecture having conditional instructions.

The invention claimed is:

1. A debugging method for displaying information corresponding to a variable and an address, both of which are designated by a user, based on location information generated by a compiler, the method comprising:
    detecting at least two entries within the location information corresponding to the user designated variable and address, each of the at least two entries including a first information field for specifying the variable, a second information field for specifying a life range of the variable, which includes the address therein, a third information field for specifying a resource which is allocated to the variable, and a fourth information field for specifying a condition flag to be referenced during an operation corresponding to the entry;
    examining whether the condition flag of the fourth information field of each of the at least two entries designates true or false;
    selecting one of the at least two entries based on the examined condition flags; and
    displaying the value allocated to the resource of the selected entry.

2. A debugging method for displaying information corresponding to a variable and an address, both of which are designated by a user, based on location information generated by a compiler, the method comprising:
    detecting at least two entries within the location information corresponding to the user designated variable and address, each of the at least two entries including a first information field for specifying the variable, a second information field for specifying a life range of the variable, which includes the address therein, a third information field for specifying a resource which is allocated to the variable, and a fourth information field for specifying two condition flags to be referenced during an operation corresponding to the entry and an operation relating to the two condition flags;
    examining, for each of the at least two entries, whether the operational result determined by performing the operation relating to the two condition flags on these flags designates true or false; selecting one of the at least two entries based on the examined operational results; and
    displaying the value allocated to the resource of the selected entry.

3. A computer-implemented debugging device for displaying information corresponding to a variable and an address, both of which are designated by a user, based on location information generated by a compiler, the debugging device comprising:
    a detecting section that detects at least two entries within the location information corresponding to the user designated variable and address, each of the at least two entries including a first information field for specifying the variable, a second information field for specifying a life range of the variable, which includes the address therein, a third information field for specifying a resource which is allocated to the variable, and a fourth information field for specifying a condition flag to be referenced during an operation corresponding to the entry;
    an examining section that examines whether the condition flag of the fourth information field of each of the at least two entries designates true or false;
    a selecting section that selects one of the at least two entries based on the examined condition flags; and
    a displaying section that displays the value allocated to the resource of the selected entry.

4. A computer-implemented debugging device for displaying information corresponding to a variable and an address, both of which are designated by a user, based on location information generated by a compiler, the debugging device comprising:
    a detecting section that detects at least two entries within the location information corresponding to the user designated variable and address, each of the at least two entries including a first information field for specifying the variable, a second information field for specifying a life range of the variable, which includes the address therein, a third information field for specifying a resource which is allocated to the variable, and a fourth information field for specifying two condition flags to be referenced during an operation corresponding to the entry and an operation relating to the two condition flags;
    an examining section that examines, for each of the at least two entries, whether the operational result determined by performing the operation relating to the two condition flags on these flags designates true or false;
    a selecting section that selects one of the at least two entries based on the examined operational results; and
    a displaying section that displays the value allocated to the resource of the selected entry.

* * * * *